US007556685B2

(12) United States Patent
Nicholson et al.

(10) Patent No.: US 7,556,685 B2
(45) Date of Patent: Jul. 7, 2009

(54) COMPOSITION OF ARCHITECTURAL PAPIER-MÂCHÉ AND ARTICLES MADE THEREWITH

(75) Inventors: Jared Morris Nicholson, Charlotte, NC (US); Sharon Anklin Goheen, Cornelius, NC (US)

(73) Assignee: Nicholson-Goheen, LLC, Cornelius, NC (US)

( * ) Notice: Subject to any disclaimer, the term of this patent is extended or adjusted under 35 U.S.C. 154(b) by 619 days.

(21) Appl. No.: 11/218,958

(22) Filed: Sep. 3, 2005

(65) Prior Publication Data

US 2007/0051281 A1  Mar. 8, 2007

(51) Int. Cl.
*C04B 11/00* (2006.01)

(52) U.S. Cl. .................. 106/772; 106/774; 106/775; 106/778; 106/780; 106/792; 106/793; 106/794; 106/795; 106/800; 106/801; 106/811; 106/817; 524/2; 524/3; 524/5

(58) Field of Classification Search .................. 106/772, 106/774, 775, 778, 780, 792, 793, 794, 795, 106/800, 801, 811, 817; 524/2, 3, 5
See application file for complete search history.

(56) References Cited

U.S. PATENT DOCUMENTS 6,303,061 B1 * 10/2001 Hewins ...................... 264/122

OTHER PUBLICATIONS

JP 08183881 A (Jul. 16, 1996) abstract only.*

* cited by examiner

*Primary Examiner*—Paul Marcantoni
(74) *Attorney, Agent, or Firm*—Clements Bernard PLLC; Christopher L. Bernard

(57) ABSTRACT

The invention is a composition of an architectural papier-mâché, and articles made therewith. Articles formed from using the architectural papier-mâché have excellent weather resistance, and can be used outdoors, as well as indoors. The composition is comprised of cellulose insulation and a joint compound. Cellulose insulation is a paper-based material, like newsprint or phonebook paper that is shredded and chemically treated with boric acid, which imparts resistance to mold, mildew, fungus, insects, moisture and flammable combustion.

13 Claims, 2 Drawing Sheets

COMPOSITION OF ARCHITECTURAL PAPIER-MÂCHÉ AND ARTICLES MADE THEREWITH

BACKGROUND OF THE INVENTION

Field of the Invention

The invention relates to architectural construction materials, and more particularly to a composition of an architectural papier-mâché, which is structurally functional and resistant to mold, mildew, fungus, insects, moisture and flammable combustion.

SUMMARY OF THE INVENTION

The invention is a composition of an architectural papier-mâché, and articles made therefrom. Articles formed using the invented architectural papier-mâché have excellent weather resistance, and can be used outdoors, as well as indoors. The composition is comprised of cellulose insulation and a joint compound. Cellulose insulation is a paper-based material, like newsprint or phonebook paper that is shredded and chemically treated, thereby imparting resistance to mold, mildew, fungus, insects, moisture and flammable combustion. The joint compound is comprised of a calcium salt, such as gypsum, plaster-of-paris, anhydrite, limestone, calcite or dolomite; a mineral silicate such as clay; a polymeric binder; and water. The polymeric binder is typically present as an emulsion or dispersion in water. Typically, the joint compound also contains magnesium salts, such as hydrous magnesium-aluminum silicates, which are the principal component of attapulgite clay, hydrous magnesium silicate that is the principal component of talc, and aluminosilicate minerals, which are the principal component of mica. On a dry weight basis the cellulose insulation is present from about 3.7% to about 18.8%, and the joint compound is present from about 96.3% to about 81.2%. Dilution water is added as needed to effect the structural and artistic criteria. The composition typically has a viscosity that is similar to bread dough, such that it can support its own mass when applied. The composition attains strength as it dries. Typically, drying is at room temperature, but the drying rate can be increased by employing higher temperatures and/or forced air (i.e., fans).

The composition is a paintable medium that is excellent for fabricating a wide variety of articles. A partial list includes: arts and crafts such as small sculptures, 3-dimensional plaques and plates, molds and impressions (i.e., stamped forms), and sculpted frames (i.e., mirrors and paintings); structures and applications in houses, such as wall repair patching, which replaces the need for joint tape, lap board restoration, wall bending to replace square corners with concave smooth corners, archways, repair of decorative wood moldings, creation of new moldings and sculpted architecture room dividers, 3-dimensional faux finishing, 3-dimensional murals, walls that provide thermal insulation and sound proofing, and fireplaces. The heat resistance of the architectural papier-mâché allows elaborate sculptured forms to be made without wood, rock, or cement. Architectural papier-mâché articles are also applicable for structures and applications in commercial buildings, and a partial list includes: 3-dimensional signs, facades for building fronts, coverings for beams, and for building sets in theatres and studios.

The architectural papier-mâché has a relatively low coefficient of thermal expansion, so it is suitable for structures that experience wide temperature variations. Illustrative examples are articles such as outdoor sculptures, entablature, friezes, facades and moldings. In outdoor applications the composition is typically further comprised of a concrete sealant, such as a silane/siloxane silicone coating (or silicate mixture) to provide a seal from ambient moisture.

The architectural papier-mâché adheres to ceiling and wall surfaces, stucco, brick, metal, wood, glass, and drywall, so long as the surface is substantially free of dust.

OBJECTS OF THE INVENTION

A principal object of the invention is to provide a composition of an architectural papier-mâché that has excellent workability and is suitable for fabricating articles that are suitable for outdoor or indoor applications.

A further object of the invention is provide a composition that has excellent sound insulation properties.

A further object of the invention is provide a composition that utilizes a recycled product, like newsprint.

An additional object of the invention is provide a composition that has excellent resistance to mold, mildew, fungus, insects, moisture and flammable combustion.

Another object of the invention is to provide composition of an architectural papier-mâché that dries at room temperature.

BRIEF DESCRIPTION OF THE DRAWINGS

The foregoing and other objects will become readily apparent by referring to the following detailed description and the appended drawings in which.

DETAILED DESCRIPTION

Figure 1:
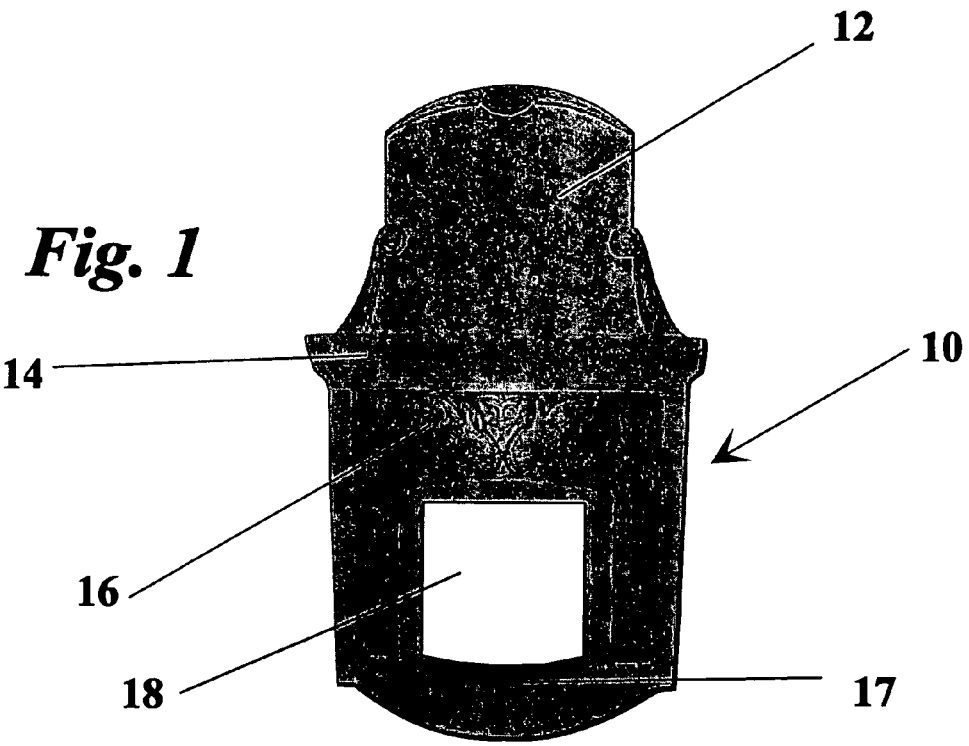
FIG. 1 is a frontal view of a fireplace fabricated using the invented architectural papier-mâché composition.

The invention is a composition of an architectural papier-mâché, and articles made therefrom. Articles formed using the architectural papier-mâché have excellent weather resistance, and can be used outdoors, as well as indoors. The composition is comprised of cellulose insulation and a joint compound. A preferred cellulose insulation is comprised of not less than 85 wt. % of a paper-based material. Newsprint and phonebook paper are excellent sources of the paper-based material, and can contain a relatively high content of recycled paper, on the order of 80%. The cellulose insulation provides comparable or superior thermal insulation as fiberglass. The paper-based material is treated with at least one retardant to provide resistance to mold, mildew, fungus, insects, moisture, and flammable combustion. A preferred retardant is boric acid, up to 15 wt. %. The retardant is adhered to the paper based material with a size, such as starch, which has good compatibility with newsprint. Wheat starch has better aging properties than for instance cornstarch, and it is a preferred size at not more than 2 wt. % of the cellulose insulation. The joint compound is comprised of a calcium salt, such as gypsum, plaster-of-paris, anhydrite, limestone, calcite or dolomite; a mineral silicate such as clay; a polymeric binder; and water. The preferred calcium salt is gypsum (i.e., $CaSO_4.2H_2O$), limestone (i.e., $CaCO_3$), dolomite (i.e., $CaMg(CO_3)_2$), or a blend thereof and is present in an amount of up to 54 wt. %. The water is present at less than 35 wt. %. The preferred polymeric binder is polyvinyl acetate or polyethylene vinyl acetate or a blend thereof. The binder is present at less than 5 wt. %. In a preferred embodiment, the joint compound also contains magnesium salts, such as hydrous magnesium-aluminum silicates, which are the principal components of attapulgite clay at less than 5 wt. %; hydrous magnesium silicate, which is the principal component of talc at less than 10 wt. %; aluminosilicate minerals, which are the principal components of mica and pyrophyllite at less than 10 wt. %; and crystalline silica at less than 2 wt. %.

The cellulose insulation and joint compound are intimately combined, and on a dry weight basis the cellulose insulation is present from about 3.7% to about 18.8%, and the joint compound is present from about 96.3% to about 81.2%. On a wet basis, using the formula above, the cellulose insulation is present from about 2.4% to about 13.0%, and the joint compound is present from about 97.6% to about 87.0%.

In addition to the previously enumerated components, the composition can also include colorants and pigments, as well as components that produce a specific desired effect. For instance, gold chips, glass, rocks, marble dust, etcetera, may be included without loss of form or function. Dilution water is added as needed to effect the structural and artistic criteria, but in general the composition has a viscosity that is similar to bread dough (e.g., from about 140,000 to about 240,000 cps). The viscosity is adjusted upwards for instance for applications where the architectural papier-mâché is being applied to a ceiling or other unsupported positions where it bears its own mass. Following application, architectural papier-mâché is typically dried at room temperature. Time needed to dry is a function of the relative humidity and the thickness of the mass. The drying time can be shortened by application of heat and/or lowering the humidity and using forced air.

Figure 2:
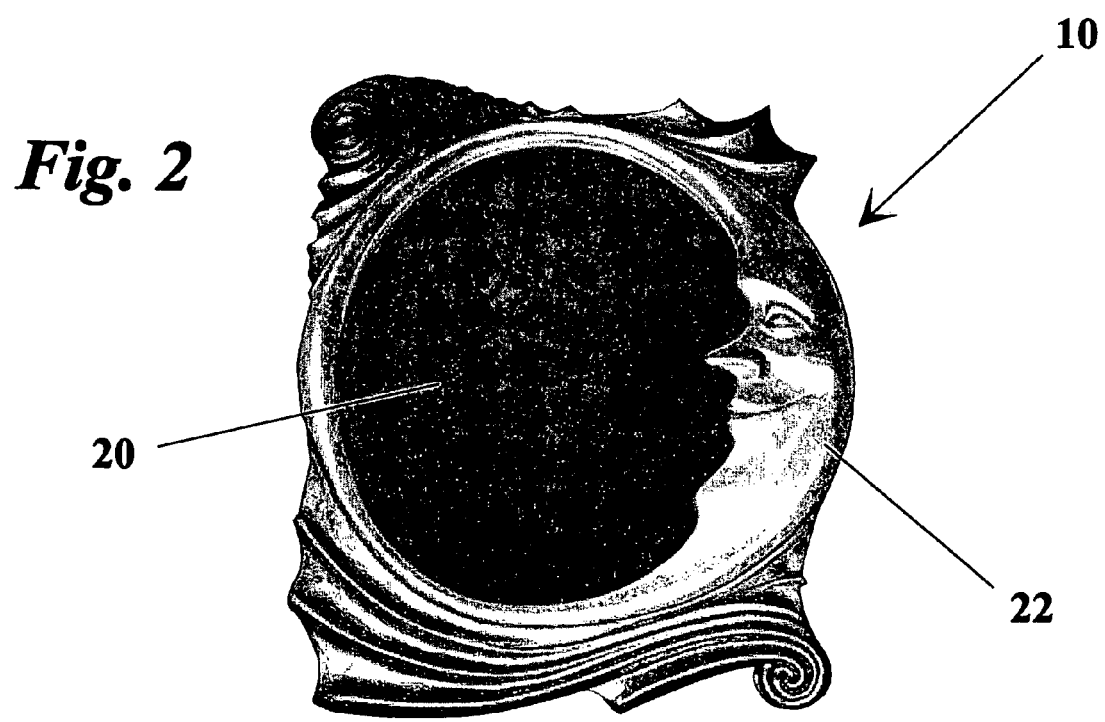
FIG. 2 is a frontal view of a mirror fabricated from the invented composition.
Figure 3:
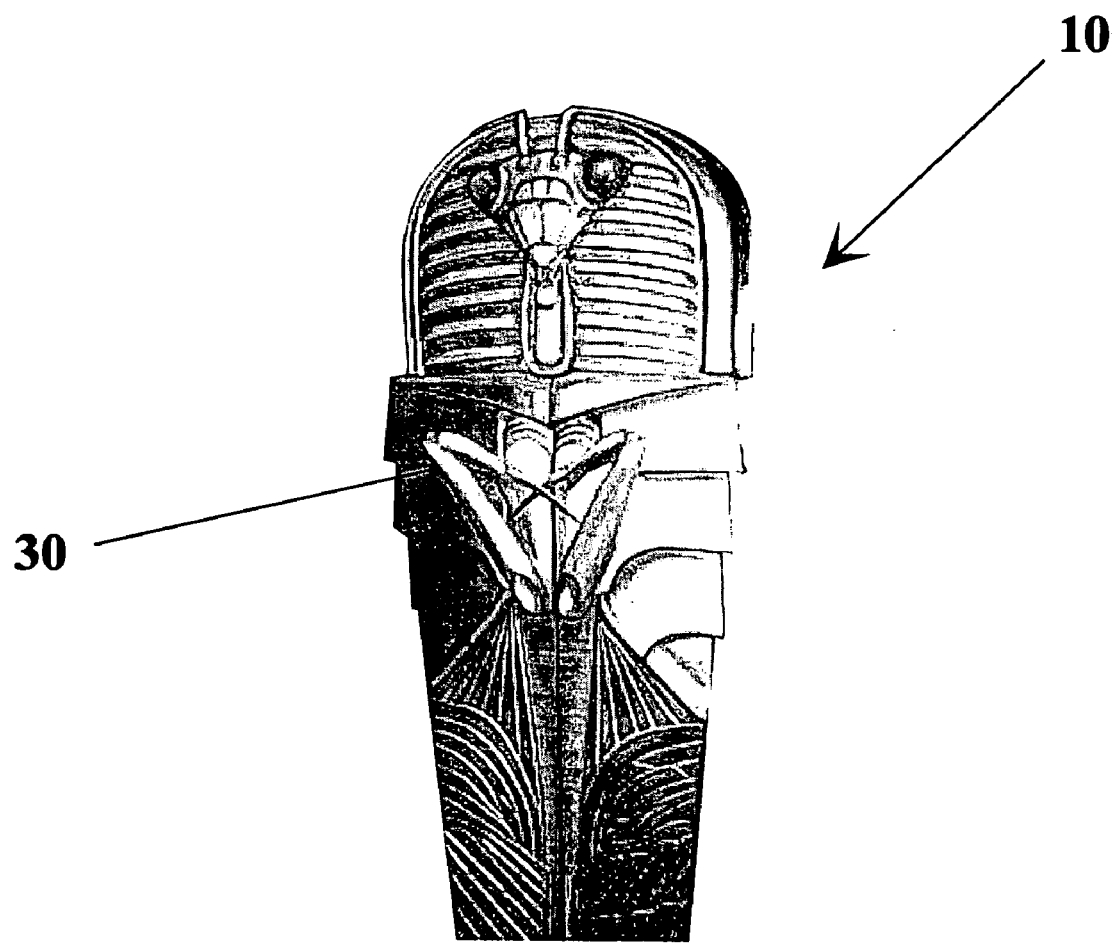
FIG. 3 is a frontal view of a sarcophagus fabricated from the invented composition.

Examples of articles 10 fabricated using the architectural papier-mâché composition are illustrated in FIGS. 1-3. FIG. 1 is a fireplace having a hearth 15, a mantle 12, an ornate over-mantle 14, an ornate combination filler panel-header 16, and a firebox 18. FIG. 2 is a mirror 20 with an ornate frame 22, where the frame is made exclusively with the composition, or in combination with an inexpensive supporting structure, such as wood. FIG. 3 is a sarcophagus 30. In each of these articles 10, the architectural papier-mâché is both structurally functional and capable of being fabricated into very ornate pieces. The fireplace additionally illustrates that the composition has excellent resistance to heat, and the coffin/sarcophagus 30 illustrates that the article has excellent resistance to moisture, mold, and insects. The mirror 20 illustrates how sculpturing can be incorporated into the article. The articles can be painted, varnished, or laminated to fabrics or support elements. In articles intended for outdoor use, the article is coated with a concrete sealant, such as a silane/siloxane silicone coating (or silicate mixture).

The descriptions above and the accompanying drawings should be interpreted in the illustrative and not the limited sense. While the invention has been disclosed in connection with the preferred embodiment or embodiments thereof, it should be understood that there might be other embodiments that fall within the scope of the invention as defined by the following claims. Where a claim is expressed as a means or step for performing a specified function, it is intended that such claim be construed to cover the corresponding structure, material, or acts described in the specification and equivalents thereof, including both structural equivalents and equivalent structures.

What is claimed is:

1. A composition of an architectural papier-mâché, said composition comprising cellulose insulation and a joint compound; wherein the cellulose insulation is comprised of paper that is finely divided, a size, and a retardant that imparts resistance to mold, mildew, fungus, insects, moisture and flammable combustion to the paper; wherein the joint compound is comprised of a calcium salt; a mineral silicate; a polymeric binder; and water, and wherein on a dry weight basis the cellulose insulation is present from about 3.7% to about 18.8%, and the joint compound is present from about 96.3% to about 81.2%.

2. The composition as claimed in claim 1, wherein said paper that is finely divided is sourced from newsprint or telephone books.

3. The composition as claimed in claim 1, wherein said retardant is boric acid.

4. The composition as claimed in claim 1, wherein said size is wheat starch.

5. The composition as claimed in claim 1, wherein said calcium salt is selected from the group consisting of gypsum, plaster-of-paris, anhydrite, limestone, calcite, dolomite or a combination thereof.

6. The composition as claimed in claim 1, wherein said mineral silicate is clay.

7. The composition as claimed in claim 1, wherein said polymeric binder is polyvinyl acetate or polyethylene vinyl acetate or a blend thereof.

8. The composition as claimed in claim 1, wherein said joint compound is further comprised of magnesium salts, selected from the group consisting of hydrous magnesium-aluminum silicates which are the principal component of attapulgite clay and hydrous magnesium silicate which is the principal component of talc.

9. The composition as claimed in claim 1, wherein said joint compound is further comprised of aluminosilicate minerals, which are the principal component of mica and pyrophyllite.

10. The composition as claimed in claim 1, wherein said joint compound is further comprised of crystalline silica.

11. The composition as claimed in claim 1, wherein said paper is comprised of up to 80 wt. % recycled paper.

12. A composition of an architectural papier-mâché, said composition comprising:
   about 2.4% to about 13.0% of cellulose insulation comprised of not less than 85 wt. % of paper, not more than 15 wt. % boric acid, and not more than 2 wt. % of a size; and
   from about 97.6% to about 87.0% of joint compound comprised of less than 54 wt. % of gypsum ($CaSO_4.2H_2O$) or limestone ($CaCO_3$) or dolomite ($CaMg(CO_3)_2$) or a blend thereof, less than 35 wt. % of water, less than 5 wt. % of binder, less than 5 wt. % of hydrous magnesium-aluminum silicates, less than 10 wt. % of hydrous magnesium silicate, less than 5 wt. % aluminosilicate minerals, and less than 2 wt. % of crystalline silica.

13. The composition as claimed in claim 11, wherein said composition has a viscosity that is similar to bread dough from about 140,000 to about 240,000 cps.

* * * * *